April 5, 1938.  L. P. MILLARD  2,112,922
HARVESTER
Filed Oct. 2, 1936  2 Sheets-Sheet 1

Inventor
Lee P. Millard
By V. F. Larrague
Atty.

April 5, 1938. L. P. MILLARD 2,112,922
HARVESTER
Filed Oct. 2, 1936 2 Sheets-Sheet 2
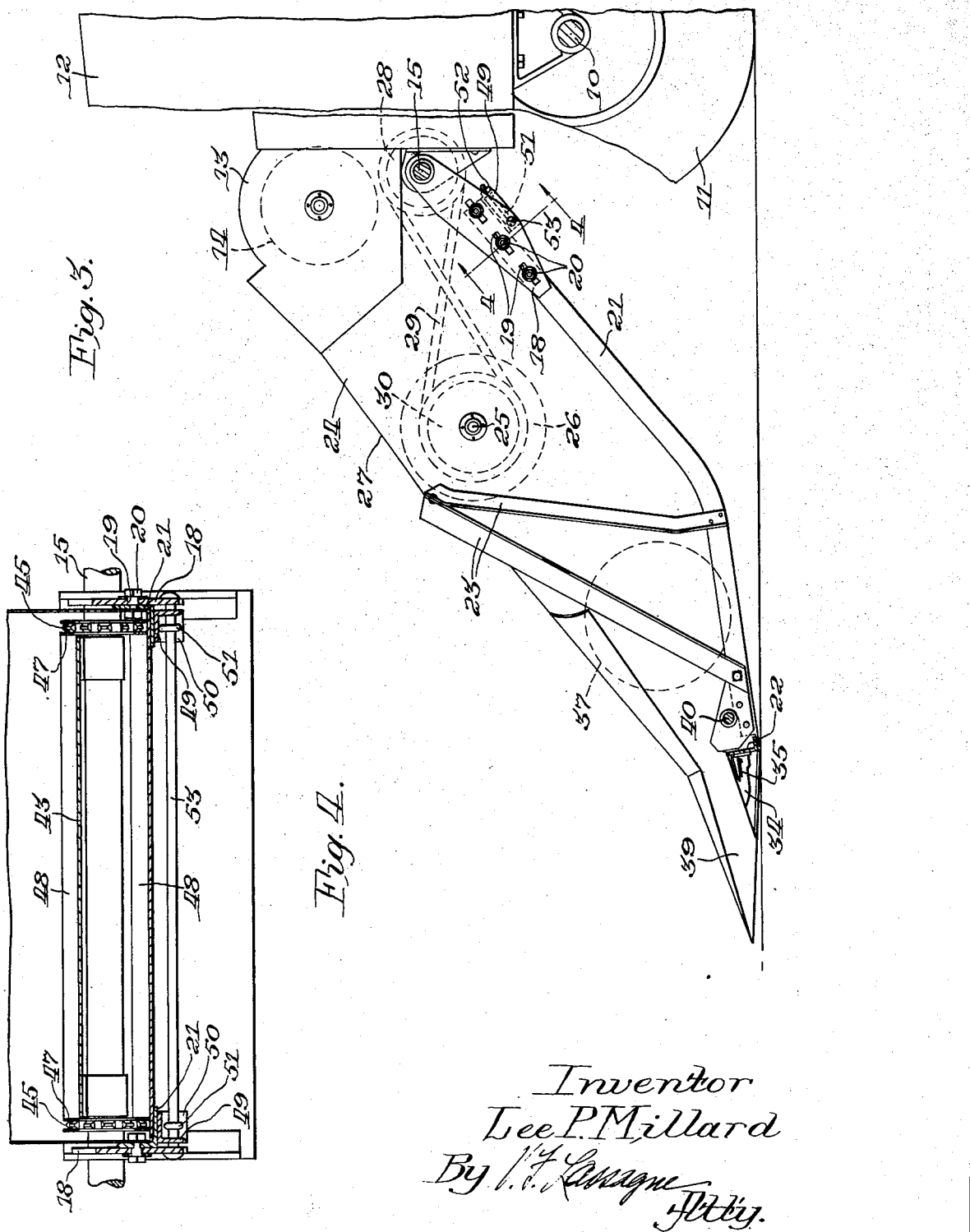
Inventor
Lee P. Millard
By [signature] Atty.

Patented Apr. 5, 1938

2,112,922

UNITED STATES PATENT OFFICE 2,112,922

HARVESTER

Lee P. Millard, Moline, Ill., assignor to International Harvester Company, a corporation of New Jersey Application October 2, 1936, Serial No. 103,720

15 Claims. (Cl. 56—123)

The invention relates to a harvester thresher, or like machine, having a crop treating body, such as a thresher part, and a crop harvesting or gathering part comprising a unit mounted at the forward end of the body for up and down pivotal movement about a transverse horizontal axis, whereby said harvester part may be adjusted. Usually this harvester part embodies a transverse sickle in advance of a platform, the latter receiving the cut crop on a conveyer which serves to move the material transversely onto a feeder conveyer disposed longitudinally and serving to convey the cut crop into the thresher or body for treatment.

Such feeder conveyer usually embodies side chains with cross connecting lag bars, or an apron. At times, to take up wear, or to compensate for stretching, the conveyer must be adjusted, or tightened, and it is to the latter problem that the subject-matter of this invention is particularly directed.

In the present disclosure the harvester part is a unit with the thresher feeder conveyer, so that the feeder is longitudinally disposed, with the harvester platform and its conveyer transversely disposed to feed into the side of the thresher feeder conveyer at a right angle. Further, for the sake of illustration, the knife or sickle extends the full width of the combined thresher feeder and platform, so that the crop cut in front of the thresher feeder falls back directly thereonto, and the crop cut in front of the platform falls back onto the platform conveyer for delivery onto the feeder conveyer from its side, or at substantially a right angle.

Since the crop cut in front of the feeder conveyer passes directly back over the knife onto the said conveyer, a shield must be provided to bridge the gap or space between the back edge of the knife and the front end of the feeder conveyer. With such structure, it is not desirable to move the front end of the thresher feeder conveyer mounting in adjusting the said conveyer, since too much movement at this point may widen the gap or space mentioned and cause grain wastage.

Accordingly, it is desirable in a machine of the type mentioned to provide a simple and effective means for tensioning or slackening the feeder conveyer by means which will not alter the relative positions of the shield along the rear edge of the knife and the forward edge of the said thresher feeder conveyer.

Therefore, the main object of this invention is to provide an improved harvester construction in which the longitudinal feeder for the thresher part of a harvester thresher may be adjusted.

Another object of the invention is to accomplish such feeder conveyer adjustment by moving the entire harvester unit fore or aft relatively to the transverse horizontal axis about which the said part is pivotally mounted, said structure to include means for releasably fixing the parts in position after being adjusted to hold the conveyer in the desired condition of adjustment.

In another aspect, it is an object of the invention to adjust the feeder conveyer belt by moving the knife carrying bar.

Other objects will be apparent to those skilled in this art as the description is more fully made.

Briefly, these desirable objects are achieved in a harvester thresher of the type having a thresher body, at the forward end of which is carried a transverse horizontal shaft. This shaft at each end carries forwardly and downwardly extending pivoted plates, and to these plates are respectively connected the forwardly extending side frame members for the thresher feeder housing. At one side, said thresher feeder housing carries a transverse harvester platform, and along the entire front edge of both the feeder housing and the platform is a knife. The feeder conveyer disposed in the feeder housing has its rear end running around the transverse pivot mounting shaft heretofore mentioned and the front end of the conveyer moves around a shaft carried at the forward end of the feeder housing transversely behind the knife, and a shield behind the knife bridges the space between the rear edge of the knife and the forward edge of the said feeder conveyer. The side frame members of the feeder housing are connected to the forwardly extending plates which are pivotally mounted on a pivot shaft and, by means of a slot and bolt connection between the plates and side frame members, it is possible to push the entire feeder housing with the harvester platform as a unit and including the knife, of course, forwardly to tension the feeder conveyer belt, or bodily to move this harvester unit rearwardly to slacken the belt. This feeder conveyer belt is adjusted by bodily moving the harvester part, including the knife, fore or aft, the adjusting means including clamp means, whereby the parts may be fixed in the desired position of adjustment.

This structure is illustrated in the accompanying sheets of drawings, wherein:

Figure 3 is a general side elevational view of the structure shown in Figure 2; and, Figure 4 is a cross sectional view through the adjusting means for the thresher feeder conveyer taken along the line 4—4 of Figure 3, looking in the direction of the arrows.

Figure 1:
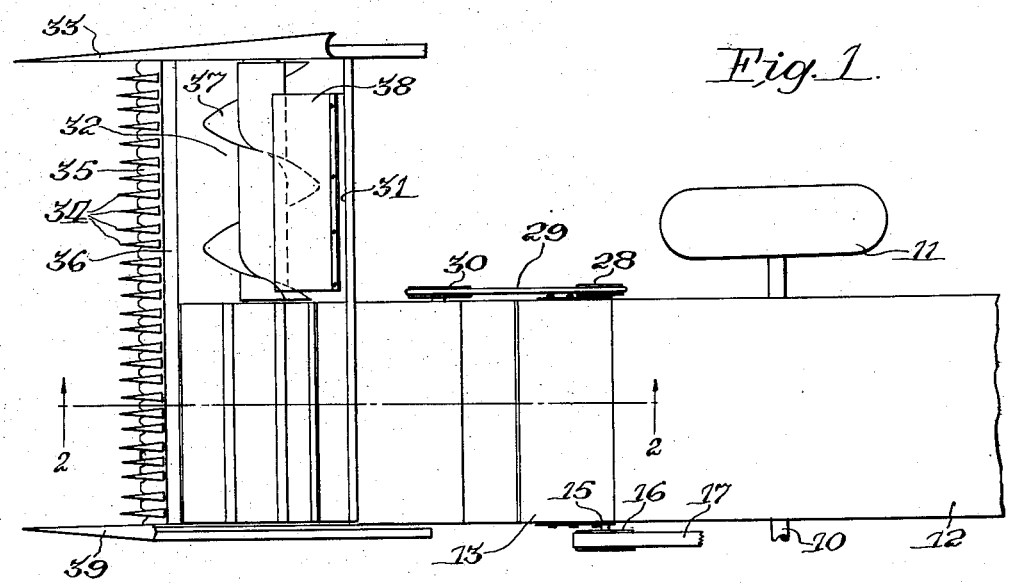
Figure 1 is a general plan view of the harvester thresher assembly.

The harvester thresher shown is of that type having a transverse axle 10 journaled in a wheel 11 at each end, (only one wheel being shown), the said axle carrying a longitudinal thresher body 12, which at its front end includes a forwardly extending housing 13, in which is rotatably carried in any appropriate manner a rotary beater drum 14. Below this beater drum the forward end of the housing 12 carries a transverse horizontal shaft 15 journaled for rotation, and carrying on the stubbleward side of the housing a pulley 16, which may be driven, for the sake of this disclosure, by a belt 17 deriving power from any suitable source, whereby, it will be understood, the shaft 15 is power driven.

At each end, the shaaft 15 has pivotally connected thereto the rear ends, respectively, of a pair of forwardly extending side plates 18, each of which is provided with a number of spaced, aligned slots 19, through each of which are passed transverse bolts 20 for connecting the spaced apart side frame members 21 to the side plates 18. These side frame members 21 extend downwardly and forwardly and at their forward ends are cross-connected by a transverse angle bar 22. The side frames 21 also carry upright frame pieces 23 to serve as a framework for a feeder house structure 24, in which is located a shaft 25 for locating within the housing a beater 26. From the front frame member 23 rearwardly the housing 24 is closed by a top 27, which is designed to telescope underneath the forward portion of the housing part 13 when the housing 24 pivots up and down about the axis of the shaft 15. The portion of the housing 24 forwardly of the front frame member 23 is open, as shown in Figures 1 and 2, and has no top portion.

At the grainward side of the machine, the shaft 15 carries a pulley wheel 28 and, by means of a crossed belt drive 29, drives a pulley wheel 30 on the shaft 25 to rotate the beater 26. From the rear frame member 23 at the grainward side of the machine and extending grainwardly is an upright back wall 31 for a harvester platform trough 32. The transverse angle bar 22 extends along the front side of both the feeder housing and said platform 32 with their grainward ends being connected by an outside divider 33. This angle bar 22, along its front side, carries the usual guard fingers 34, with which cooperates the usual transversely disposed reciprocatory sickle or knife 35, and, behind the rear edge of the knife and extending upwardly and rearwardly along the full length of said angle bar 22 is a shield 36, over which the cut grain falls in being transferred back onto the platform trough 32. Disposed above the platform is a short transverse screw conveyer 37 for moving the grain receiver by the platform 32 and cut in front thereof in a stubbleward direction into the open front end of the feeder housing, there being provided on the back wall 31 a forwardly and downwardly extending baffle 38 to aid in moving the material on the platform 32 in the stubbleward direction mentioned. At the stubbleward end of the feeder housing 24 is an inside divider 39.

Figure 2:
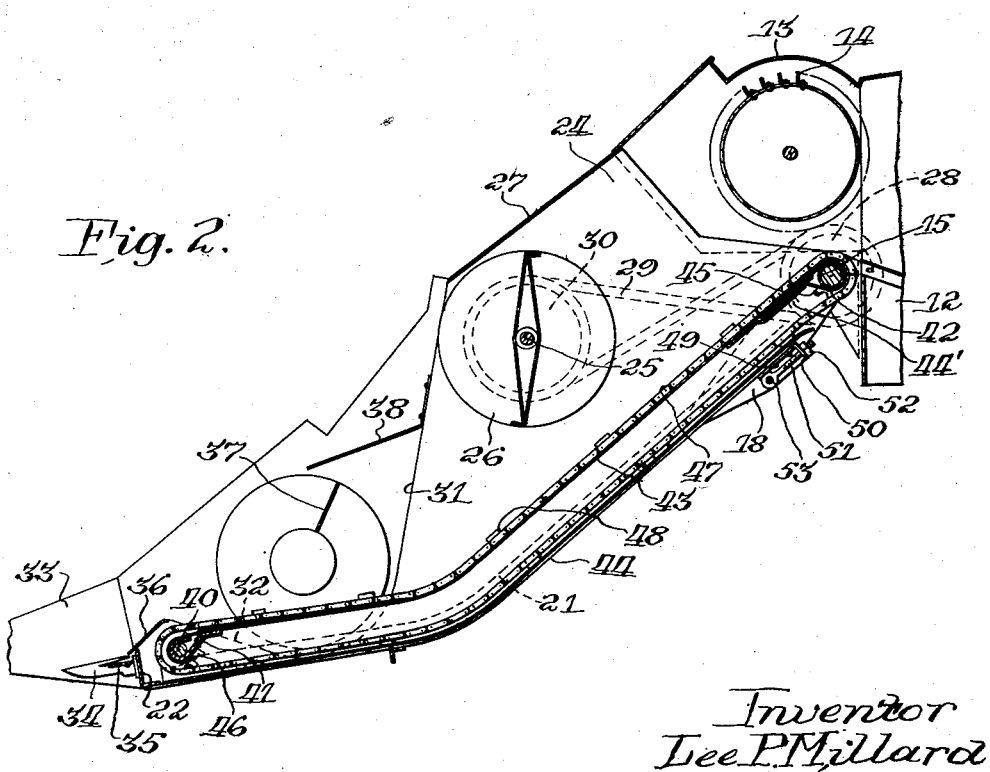
Figure 2 is a central longitudinal, sectional view through the machine, taken along the line 2—2 of Figure 1, looking in the direction of the arrows.

The shield 36, as can be seen in Figure 2, is an extension of the auger trough 32. In other words, the shield 36 and the auger trough 32 and backboard 31 are a continuous sheet of sheet metal bent to the form shown. At the forward end of the harvester part rearwardly of the angle bar 22 and below the shield extension 36 and the auger trough 32 is journaled a transverse shaft 40, around which, for the width of the feeder housing, is wrapped a sheet metal bracket 41. Similarly and of the same width, there is wrapped a sheet metal bracket 42 around the shaft 15, said brackets carrying a sheet metal false bottom 43 conforming to the shape of the bottom of the feeder housing, which latter bottom appears at 44. The sheet bottom 43 at its upper end is formed with a bifurcated end 44' to embrace the forward extension of the sheet metal bracket 42, so that relative movement between the bottom 43 and the bracket 42 may take place, for a purpose later to appear. At the ends of the shaft 15, as shown in Figure 4, is a pair of respective sprocket wheels 45, and in similarly spaced relationship on the shaft 40 is another pair of spaced sprocket wheels 46. Trained around these respective sprocket wheels is a pair of spaced parallel sprocket chains 47, cross-connected at intervals by slats or transverse lag bars 48. Thus is provided an endless feeder conveyer between the shafts 40 and 15 located at the bottom of the feeder housing 24, in which the lower end of the chain of the conveyer drags downwardly and forwardly over the bottom 44, and the upper run of the conveyer drags forwardly and upwardly over the top side of the tight bottom 43.

A structure is provided for adjusting this feeder conveyer, which structure is as follows: As shown in Figures 2 and 4, each side frame bar 21 carries a short longitudinally extending angle bar 49 rigidly connected thereto as by welding, the upper end of each said bar 49 including an end wall 50, which is provided with an aperture, so that eye bolts 51 may be respectively located in the openings, the shafts of said bolts being threaded and provided respectively with nuts 52 on the back side of the wall portions 50. The eyes of these bolts are carried fixed to a cross-shaft 53 which is rigidly mounted in the side plates 18.

In use and operation, the entire feeder housing 24 and platform 32 constitute the harvester part, since the knife 35 extends along the front edge and for the full width of these two portions. The entire unit is mounted for up and down pivotal movement about the transverse axis of the drive shaft 15. Grain cut by the knife falls back onto the platform 32 and also directly back onto the feeder conveyor 48, the grain falling directly onto the feeder immediately carried rearwardly and upwardly, and with the aid of the beaters 26 and 14 being moved into the thresher body 12 for treatment. That grain falling onto the platform 32 is moved stubblewardly by the screw conveyer 37 onto the feeder conveyer 48 from its side or at a right angle, as shown in Figure 1, and is then moved rearwardly and upwardly by the feeder conveyer for the same purpose.

When it is desired to adjust the feeder conveyer 48, this is accomplished by loosening the three bolts 20 in the slots 19 on each side of the feeder housing or at each plate 18. By manipulating thereafter the nuts 52 on each side of the feeder housing, the entire harvester part, since it is mounted on the side frames 21, can be extended forwardly or retracted rearwardly to adjust the tension of the chains 47. Since the adjustment in effect moves the shaft 40 fore or aft in relation to the relatively fixed shaft 15, the sliding joint heretofore described at the upper end of the tight bottom 43 makes such adjustment possible. In effect, then, the conveyer belt is tensioned by moving the knife fore or aft. When the adjustment has been completed, the three bolts 20 on each side are tightly clamped and the adjustment has been completed. From this disclosure it can now be seen that an improved and simplified means has been provided for adjusting belts in a harvester organization of the type described.

It is the intention to cover all changes and modifications of the form of the invention selected for purposes of disclosure by way of illustration which do not in material respects constitute departures from the spirit and scope of the invention.

What is claimed is:

1. In a harvester, a body carrying a longitudinal feeder conveyer for hinging movement about a transverse horizontal axis, a transverse platform conveyer at the side of the feeder conveyer and feeding thereinto, a knife-carrying bar extending across the front edge of both the feeder and platform conveyers, and means for adjusting the tension of the feeder conveyer by moving said knife bar.

2. In a harvester, a body carrying a longitudinal feeder conveyer, a transverse platform conveyer at the side of the feeder conveyer and feeding thereinto, said conveyers being carried on a unitary frame having up and down hinging movement, and means for adjusting the tension of the feeder conveyer by moving said unitary frame in relation to said axis.

3. In a harvester, a body carrying a longitudinal feeder conveyer for hinging movement about a transverse horizontal axis, a knife-carrying bar extending across the front edge of the feeder conveyer, and means for adjusting the tension of the feeder conveyer by bodily moving said knife bar fore or aft in relation to the said axis.

4. In a harvester, a body carrying a longitudinal feeder conveyer for hinging movement about a transverse horizontal axis, a transverse knife-carrying bar extending across the front edge of the feeder conveyer, and means for adjusting the tension of the feeder conveyer by bodily moving said body fore and aft in relation to said axis.

5. In a harvester, a body carrying a longitudinal feeder conveyer for hinging movement about a transverse horizontal axis, a transverse knife-carrying bar extending across the front edge of the feeder, a shield between the bar and front edge of the conveyer, said shield being fixed against movement in at least one direction with respect to said front edge of the conveyer, and means for adjusting the tension of the feeder conveyer without altering the fixed relationship of the front edge of the conveyer to said shield.

6. In a harvester, a body carrying a longitudinal feeder conveyer for hinging movement about a transverse horizontal axis, a transverse bar extending across the front edge of the feeder conveyer, the front edge of the conveyer having a fixed relationship to the bar, and means for adjusting the tension of the feeder conveyer by moving said bar and the front edge of the conveyer together.

7. In a harvester, a body carrying a longitudinal feeder conveyer for hinging movement about a transverse horizontal axis, a knife-carrying bar extending across the front edge of the feeder, and means for adjusting the tension of the feeder conveyer by moving said knife bar fore and aft with the front end of the conveyer, said means being located in proximity to the axis mentioned.

8. In a harvester, a body, a longitudinal feeder housing pivotally connected at its rear end for up and down movement to the body about the axis of a transverse horizontal shaft, an endless longitudinal feeder conveyer disposed in said housing, a transverse horizontal shaft located across the front end of the housing, said conveyer being trained around said shafts, a transverse bar in advance of the feeder conveyer, said bar carrying a knife, the front end of the feeder conveyer being disposed in fixed spaced relation behind said bar, and means for adjusting the feeder conveyer by bodily shifting the bar and front end of the conveyer together.

9. In a harvester, a body, a longitudinal feeder housing pivotally connected at its rear end for up and down movement to the body about the axis of a transverse horizontal shaft, an endless longitudinal feeder conveyor disposed in said housing, a transverse horizontal shaft located across the front end of the housing, said conveyer being trained around said shafts, a transverse bar in advance of the feeder conveyer, said bar carrying a knife, the front end of the feeder conveyer being disposed in spaced relation behind said bar, a shield bridging said space, and means for adjusting the feeder conveyer in a manner to move the bar and front end of the conveyer in fixed relationship to said shield.

10. In a harvester, a body, a longitudinal feeder housing pivotally connected at its rear end for up and down movement to the body about the axis of a transverse horizontal shaft, an endless longitudinal feeder conveyer disposed in said housing, a transverse bar in advance of the feeder conveyer, said bar carrying a knife, the front end of the feeder conveyer being disposed in fixed spaced relation behind and to said bar, a shield bridging said space, and means located adjacent the pivot shaft for adjusting the feeder conveyer without disturbing the fixed relationship of said parts.

11. In a harvester, a body, a longitudinal feeder housing pivotally connected at its rear end for up and down movement to the body about the axis of a transverse horizontal shaft, an endless longitudinal feeder conveyer disposed in said housing, a transverse bar in advance of the feeder conveyer and platform, said bar carrying a knife, forwardly extending spaced plates pivotally carried by the shaft, said housing and plates being connected by means enabling the body to be shifted fore and aft relative to said plates, and means for so shifting the body to adjust the conveyer.

12. In a harvester, a body, a longitudinal feeder housing pivotally connected at its rear end for up and down movement to the body about the axis of a transverse horizontal shaft, an endless longitudinal feeder conveyer disposed in said housing, a transverse horizontal shaft located across the front end of the housing, said conveyer being trained around said shafts, a transverse platform including a conveyer arranged to feed into the side of the housing and feeder conveyer, a transverse bar in advance of the feeder conveyer and platform, said bar carrying a knife, and means for adjusting the feeder conveyer by shifting the bar fore and aft.

13. In a harvester, a body, a longitudinal feeder housing pivotally connected at its rear end for up and down movement to the body about the axis of a transverse horizontal shaft, an endless longitudinal feeder conveyer disposed in said housing, a transverse horizontal shaft located across the front end of the housing, said conveyer being trained around said shafts, a transverse platform including a conveyer arranged to feed into the side of the housing and feeder conveyer, and means for adjusting the feeder conveyer by shifting the housing and platform bodily fore or aft in relation to the pivot shaft.

14. In a harvester, a body, a longitudinal feeder housing pivotally connected at its rear end for up and down movement to the body about the axis of a transverse horizontal shaft, an endless longitudinal feeder conveyer disposed in said housing, a transverse horizontal shaft located across the front end of the housing, said conveyer being trained around said shafts, a transverse platform including a conveyer arranged to feed into the side of the housing and feeder conveyer, said platform being rigid with the housing to form a unit, a transverse bar in advance of the feeder conveyer and platform, said bar carrying a knife, the front end of the feeder conveyer being disposed in spaced relation to and behind said bar, and means for adjusting the feeder conveyer by bodily shifting the housing and platform as a unit fore or aft in relation to the pivot shaft.

15. In a harvester, a body, a longitudinal feeder housing pivotally connected at its rear end for up and down movement to the body about the axis of a transverse horizontal shaft, an endless longitudinal feeder conveyer disposed in said housing, a transverse horizontal shaft located across the front end of the housing, said conveyer being trained around said shafts, a false bottom connected between said shafts over which a run of the conveyer drags, a transverse bar in advance of the feeder conveyer and platform, said bar carrying a knife, the front end of the feeder conveyer being disposed in spaced relation behind said bar, and means for adjusting the feeder conveyer by moving the housing fore or aft in relation to the pivot shaft, said false bottom having a slide joint therein to permit such movement.

LEE P. MILLARD.